Oct. 23, 1928.  
G. A. WETTENGEL  
1,688,479  
DEVICE FOR PREVENTING THEFT OF AUTOMOBILES ON HIGHWAYS  
Filed March 14, 1924  2 Sheets-Sheet 1
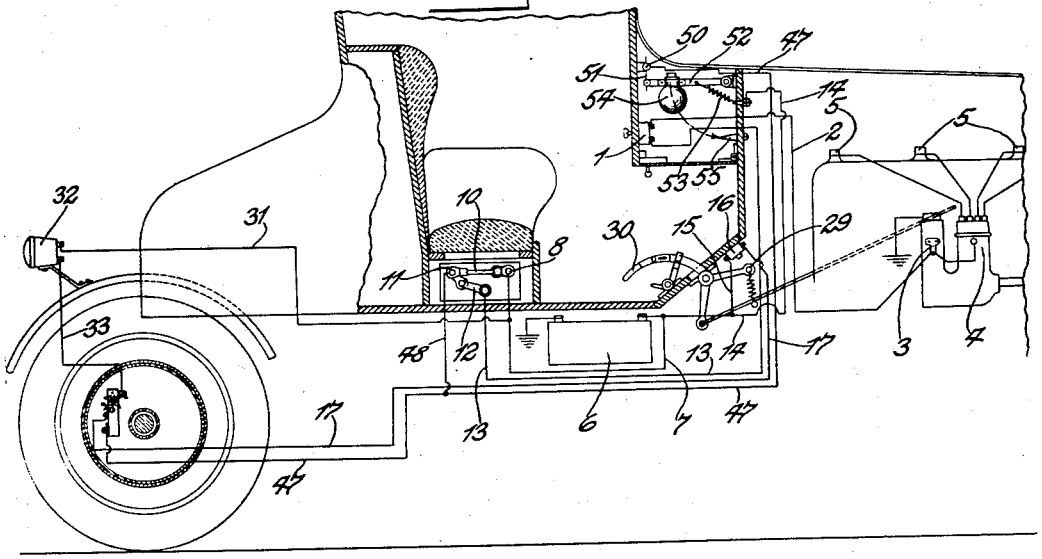
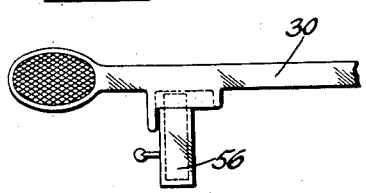
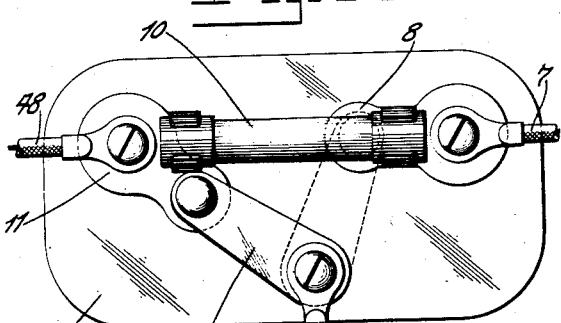
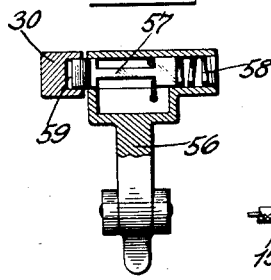
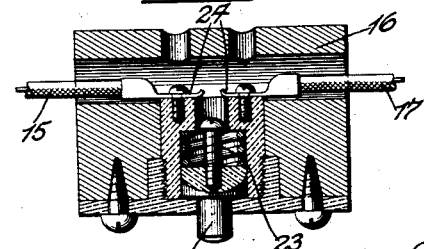
Inventor:  
George A. Wettengel,  
by Rippey Kingsland,  
His Attorneys.

Oct. 23, 1928.
G. A. WETTENGEL
1,688,479
DEVICE FOR PREVENTING THEFT OF AUTOMOBILES ON HIGHWAYS
Filed March 14, 1924   2 Sheets-Sheet 2
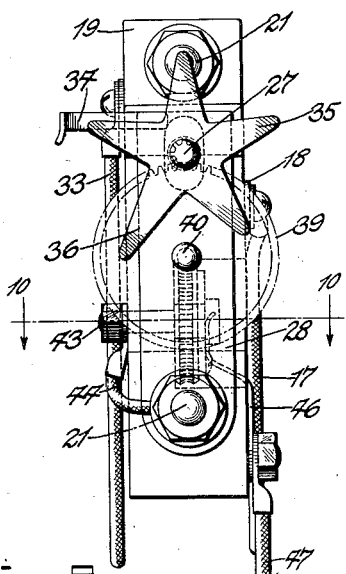
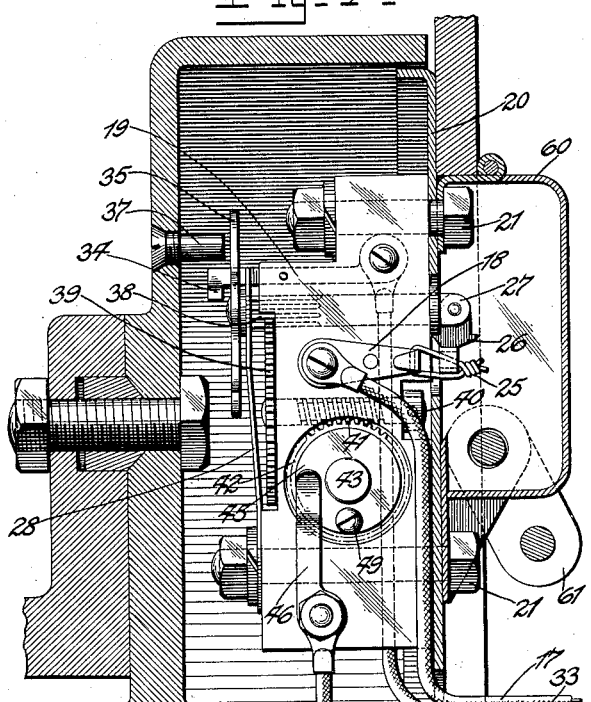
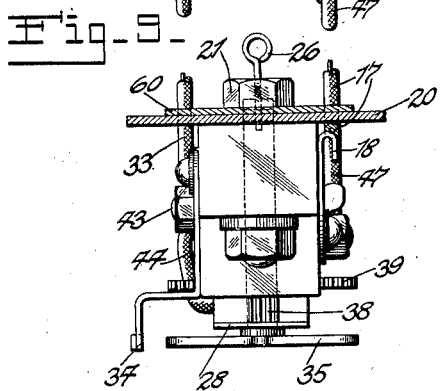
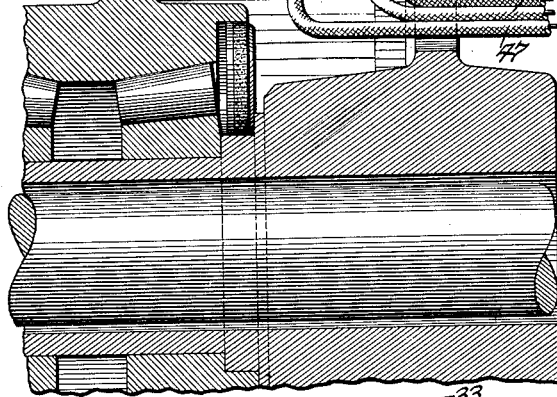
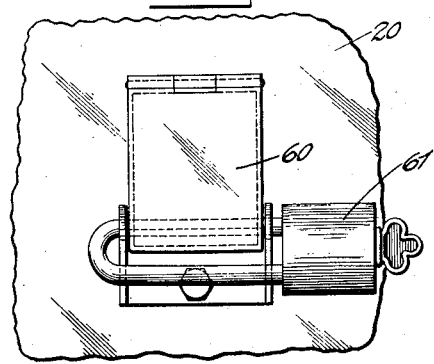
Inventor:
George A. Wettengel,
by Rippey Kingsland
His Attorneys.

Patented Oct. 23, 1928.

1,688,479

UNITED STATES PATENT OFFICE.

GEORGE A. WETTENGEL, OF ST. LOUIS, MISSOURI.

DEVICE FOR PREVENTING THEFT OF AUTOMOBILES ON HIGHWAYS.

Application filed March 14, 1924. Serial No. 699,387.

This invention relates to a device for preventing theft of automobiles on the highway.

An object of the invention is to provide a device for use upon an automobile which may be operated easily and without being seen when stopped by a thief or highwayman.

Another object of the invention is to provide a device for the purpose mentioned which when operated will short circuit the ignition wires and melt the fuse, thus disabling the automobile after it has traveled a predetermined distance from the point where said device was operated for that purpose.

Another object of the invention is to provide a signalling device in connection with the automobile that will operate to give an indication that the machine has been stolen.

An additional object is to provide means for discharging a gas to overcome and render the thief or highwayman helpless.

Other objects will appear from the following description, reference being made to the drawings in which Fig. 1 is a view showing the invention mounted in an automobile.

Fig. 2 is a detailed view of a part of the accelerator pedal which in the embodiment of the invention shown may operate the switch for short circuiting the ignition wires.

Fig. 3 is a detailed view of the locking device for the combined accelerator pedal and switch closing lever.

Fig. 4 is a sectional view of the switch that is closed by complete depression of the accelerator pedal.

Fig. 5 is a view of a fuse and switch device, the fuse being melted and thereby breaking the circuit when the circuit is shorted, and the switch device being settable to provide a closed circuit that will permit the automobile to operate.

Fig. 6 is an end elevation of the devices shown in Fig. 5.

Fig. 7 is a view showing a part of the mechanism for short circuiting the ignition wires and also for operating a signal to indicate the fact that the machine is being stolen.

Fig. 8 is a side elevation of a part of the structure shown in Fig. 7.

Fig. 9 is an outer end or plan view of the structure shown in Figs. 7 and 8.

Fig. 10 is a cross sectional view on the line 10—10 of Fig. 8.

Fig. 11 shows the cover plate for the mechanism shown in Fig. 7 and the lock for locking said cover plate in closed position.

The ignition switch 1, the wiring 2 from the ignition switch to the ignition coil 3 and thence through the distributor 4 to the spark plug 5 of the engine are arranged in the usual familiar manner. From the battery 6 a wire 7 leads to connection with a member 8 on an insulation support 9. A fuse 10 connects the member 8 to a similar member 11 on the support 9 with which a switch member 12 normally contacts. A wire 13 leads from the switch member 12 to the other side of the switch 1 which is opened and closed in the usual familiar manner.

A wire 14 leads from the wire 7 and has a wire connection 15 leading to one side of a switch 16 from the other side of which switch a wire 17 (Fig. 1 and 7) leads to a metallic part 18 on an insulation support 19 attached to a metallic stationary part 20 of the automobile by metallic bolts 21. The switch 16 is normally open (Fig. 4) and includes an actuator 22 for moving the switch member 23 into contact with the terminals 24 of the wires 15 and 17 to close the circuit. The part 18 is grounded through connections comprising a fuse 25 (Fig. 7), a lever 26 pivoted to one end of a shaft 27 mounted for endwise and rotary movements in the support 19; and a spring 28 engaging the opposite end of the shaft 27 and connected with one of the bolts 21. The fuse 25 holds the lever in the position shown (Fig. 7) thereby holding the shaft 27 in one position in opposition to the power of the spring 28 which moves said shaft endwise to another position when the fuse 25 blows out or melts, which occurs when the switch 16 is closed.

The actuator 22 of the switch 16 is in position in which it will be moved by an arm 29 (Fig. 1) in connection with the accelerator pedal 30. When the owner of the car is ordered out the pedal 30 may be operated its full distance without being noticed by the highwayman. The switch 16 is thereby closed causing the fuse 25 to blow out or melt and permitting the spring 28 to move the shaft 27 endwise to position for rotation by a moving part of the automobile when the automobile is traveling.

A wire 31 leads from the wire 7 to a signalling device or lamp 32 at the rear of the automobile. A wire 33 from the lamp or signalling device 32 is in circuit with a metallic member 34 supported by the support 19. The shaft 27 has a star wheel 35 attached thereto adjacent to the spring 28 and of which one arm 36 is long enough to contact with the member 34 when the star wheel is rotated, while the remaining arms of the star wheel are too short to contact with said member 34 when said wheel is rotated. A moving part of the automobile (in the present instance the brake drum of one of the wheels) supports a projection 37 (Fig. 7) that will alternately engage the arms of the star wheel 35 when the automobile is travelling after the shaft 27 has been moved endwise by the spring 28, as previously described. When the fuse 25 is in place it holds the star wheel 35 out of the line of travel of the projection 37 as will be readily understood by reference to Fig. 7 of the drawing. Rotation of the star wheel 35 makes and breaks the circuit for the lamp or signal 32, that is when the arm 36 of the star wheel is in contact with the member 34 the circuit is complete as ground connection for the wire 33 is formed through the member 34, the star wheel 35, the spring 28 and bolt 21. This will operate the signal 32 intermittently, thereby calling attention to the fact that the automobile is being stolen.

The shaft 27 has a wide gear 38 which is in permanent mesh with a gear wheel 39 on a shaft 40 in the support 19. The shaft 40 has a worm 41 thereon meshing with a worm pinion 42 on a shaft 43 in the support 19. The shaft 43 is connected by a wire 44 with one of the bolts 21. The worm pinion 42 has an insulation disc 45 attached thereto with which the end of a blade 46 contacts, said blade being in circuit with a wire 47 having a branch 48 leading to the member 11. A screw 49 connected with the worm pinion 42 contacts with the blade 46 once during each revolution of the pinion 42, so that after the automobile has traveled a predetermined distance from the scene of the robbery the circuit through the wires 47—48 is shorted, with the result that the fuse 10 is melted or blown out destroying the function of the ignition circuit and causing the automobile to stop.

The wire 47 leads to a connection 50 (Fig. 1) at one end of a fuse 51 that normally supports the end of a lever 52 with which the wire 14 is connected up through a spring 53. When the circuit through the wire 47 is shorted as described the fuse 51 is also melted or blown out, permitting the spring 53 to operate the lever 52 and strike a frangible gas receptacle, supported by said lever, against a pointed anvil 55. In this way the gas receptacle 54 is broken at or about the time that the automobile stops, the gas in said receptacle being released to the disablement of the bandit.

When the automobile is recovered the switch 12 may be turned from contact with the member 11 to contact with the member 8 (Fig. 5), thus forming a circuit for the ignition system.

When the automobile is parked or idle, the accelerator pedal 30 may be locked. An appropriate form of locking device is shown (Fig. 3) comprising a pivoted support 56 having a locking bolt 57 therein actuated to locking position by a spring 58. The adjacent portion of the pedal 30 is formed with a recess 59 in which the locking bolt 57 engages.

The mechanism shown in Fig. 7 is accessible through a hinged cover or door 60 that may be locked closed by a lock 61, thus preventing tampering with said mechanism.

From the foregoing it will be seen that my invention comprises an apparatus that will intermittently give a visible signal that the automobile is being stolen; that, after the automobile has been driven a predetermined distance from the scene of the robbery, will disable the ignition system so that the automobile cannot run farther under its own power; and that releases a gas to disable the bandit.

I am aware that the arrangement and relationship of the parts may be varied without departure from the nature and principle of the invention and do not restrict myself unessentially on these or other particulars.

What I claim and desire to secure by Letters Patent is:—

1. In a motor vehicle, the combination with the ignition circuit and the control switch therefor, an irreversible normally closed circuit breaking means in said circuit, a signal, means for intermittently operating said signal from the vehicle running gear including a relatively stationary part and means on said part movable into and out of engagement with a rotating part of the driving mechanism so as to cause said signal to operate intermittently in accordance with the travel of the vehicle and having means normally tending to move it into such engagement and means for normally holding the said means against such movement, said intermittent operating means also including a device assuming an operative position upon a predetermined travel of the vehicle after the intermittent means is set into operation, means including an operating member adjacent the driver's position for releasing said holding means, and means set into operation when said device reaches its operating position to cause said irreversible circuit breaking means to open said ignition circuit.

2. In a motor vehicle, the combination with the ignition circuit and the control switch therefor, of an irreversible normally closed circuit breaking means in said circuit, a signal, means for intermittently operating said signal from the vehicle running gear including a relatively stationary part and means on said part movable into and out of engagement with a rotating part of the driving mechanism so as to cause said signal to operate intermittently in accordance with the travel of the vehicle and having means normally tending to move it into such engagement and means for normally holding the said means against such movement, said intermittent operating means also including a device assuming an operative position upon a predetermined travel of the vehicle after the intermittent means is set into operation, a device for releasing said holding means, an operating member for said devices adjacent to the driver's position, and automatic means set into operation when said device reaches its operating position to cause said irreversible circuit breaking means to open said ignition circuit.

GEORGE A. WETTENGEL.